3,625,727
PROTECTIVE COATINGS
David Reginald Lightfoot, Clarksville, Md., and Roy Henry Sowden, St. Neots, England, assignors to W. R. Grace & Co., New York, N.Y.
Filed May 20, 1969, Ser. No. 826,144
Claims priority, application Great Britain, May 20, 1968, 23,967/68; Dec. 4, 1968, 57,701/68
Int. Cl. B44d *1/08, 1/34*
U.S. Cl. 117—6                                                    11 Claims

ABSTRACT OF THE DISCLOSURE

A strippable protective coating is formed on a substrate, especially a vehicle body, by spraying from a molten composition onto it. The molten composition preferably contains a mixture of a film-forming copolymer of ethylene and vinyl acetate and an auxiliary polymer, preferably another ethylene/vinyl acetate copolymer, of molecular weight below 10,000.

---

Figure 1:
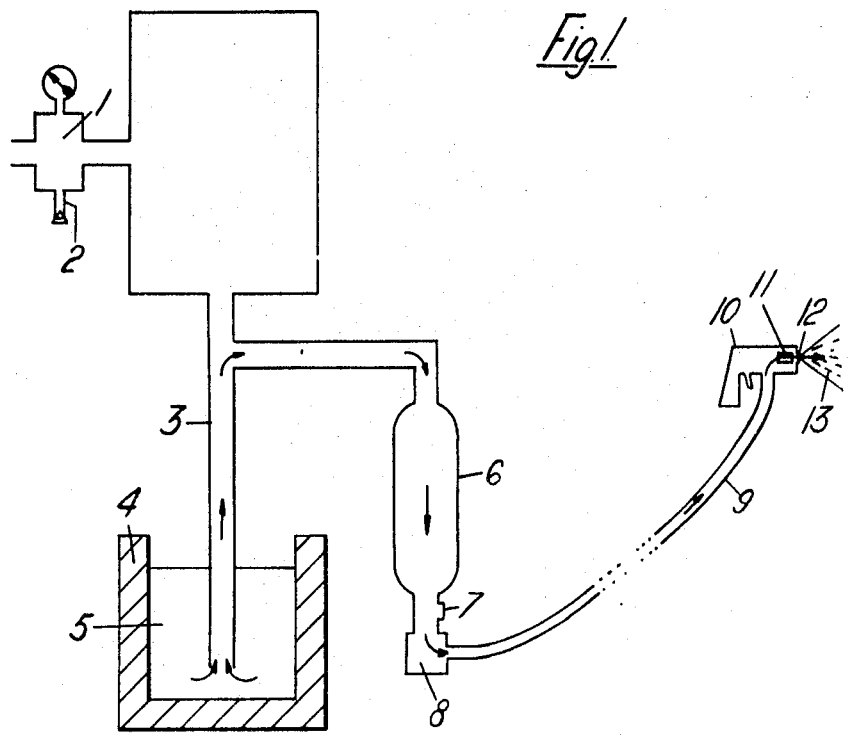

This invention relates to strippable protective coatings and their production.

Strippable protective coatings are intended to protect the surfaces of articles against corrosive or sullying influences during transport or storage. One important application is for the protection of the bodywork of automobiles and other vehicles, especially during shipment overseas.

Methods and compositions to be used for the production of such coatings are subject to fairly stringent limiting requirements. It goes without saying that the composition must be capable of forming a thin continuous protective film which is tough enough to withstand incidental handling or like degrees of friction. Moreover the adhesion of the film to the surface to be protected must be at one and the same time adequate to resist the effect of such friction, and low enough to allow it to be easily and quickly stripped off without leaving isolated patches of adhering film. A less basic, but commercially important, requirement is sometimes that the film should be substantially colourless and transparent or translucent, so that the colour of the underlying surface is not distorted or concealed. The film should be resistant to water and to salt spray, and also to fairly extreme temperature conditions, ranging from say 20° F. to 120° F. (−5 to +50° C.) or more, in high humidities.

The conditions under which the composition is applied are also important. It must for economic reasons be capable of being applied by spraying, and must dry or set quickly, within a matter of minutes. While such drying can be accelerated by the use of heat, there is a practical limit to the permissible temperature which in practice is usually about 180° F. (80° C.). There is also a practical limit to the temperature at which the coating composition is applied to the substrate; as a general rule this may be taken as being about 200° C., or not much higher, but it will vary with the nature of the substrate.

One normal way of forming protective coatings, whether strippable or not, on substrates involves applying a solution of the film-forming material to the substrate by spraying. When there is a maximum temperature limitation in the neighbourhood of 280° F. (80° C.), the solvent must in general be organic, since water will evaporate too slowly. This involves providing for solvent recovery, the cost of which must be added to the cost of the coating material and its application by spraying; moreover most organic solvents are toxic to some degree and this also necessitates special precautions, whose cost must be added to the basic costs of the process.

The present invention provides a method whereby a coating composition can be applied to form a strippable coating on a substrate without the use of a solvent and at the same time without raising the surface to be coated to an undesirably high temperature.

According to the invention a strippable protective coating is formed on a substrate by spraying a coating composition onto the substrate in the form of a melt.

It has been found that certain coating compositions based on thermoplastic organic polymers are particularly well suited for application in this way. These compositions are essentially mixtures of film-forming ethylene/vinyl acetate copolymers (using the term to include copolymers derived from a plurality of monomers generally) with compatible polymers of lower molecular weight. However other compositions having suitable properties, such as melt viscosity, at useful temperatures can be used.

The film-forming ethylene/vinyl acetate copolymer preferably has a content of vinyl acetate above about 15% by weight, e.g. from 15 to 40%. Its melt flow index is preferably at least about 50 and may be as high as 600 or even higher. (All melt flow indexes in this specification are those determined by ASTM method D1238–62T.) Generally speaking it will be from 40 to 750 and preferably 100–600, but the optimum value will vary inter alia with the proportion and nature of the compatible polymer of lower molecular weight.

The latter, which for brevity will be termed the auxiliary polymer, has as an important function to reduce the melt viscosity of the ethylene/vinyl acetate copolymer, and thus the temperature at which it can be melt sprayed. While any auxiliary polymer capable of doing this to a useful degree can be used, it is preferred to use either an ethylene homopolymer (polyethylene) or an ethylene/vinyl acetate copolymer of low molecular weight, preferably below 10,000 and especially below 8,000 (the molecular weights referred to in this specification are number average molecular weights determined osmometrically). Generally a range of about 1500–8000 is preferred, but as with the film-forming ethylene/vinyl acetate copolymer the optimum molecular weight will depend to some extent on the chemical nature of the auxiliary polymer and on the relative proportions of the two components of the mixture.

The ratio of film-forming copolymer to auxiliary polymer is normally from 1:0.2 to 1:6, more usually 1:0.4 to 1:4 in which case it constitutes approximately 20–70% by weight of the composition. Preferably the ratio of film-forming copolymer to auxiliary polymer is from 1:0.7 to 1:1.25. The optimum proportions for any particular case can be determined by routine test. In terms of weight percentage ranges of film-forming copolymer, the above ratios can be translated as from about 14% to 83% by weight of film-forming copolymer for the broad ratio range and from about 44% to 59% for the preferred ratio range. The corresponding ranges for the auxiliary polymer are thus 17 to 86% and 41 to 56% by weight, respectively.

Preferably both the film-forming and the auxiliary copolymers are ethylene/vinyl acetate copolymers.

The auxiliary polymer is preferably an ethylene/vinyl acetate copolymer having a vinyl acetate content of 12–18%, especially 15%, and a molecular weight below 5,000. One commercially available such copolymer is referred to in the examples. These preferred copolymers are sometimes referred to in the art as "polyethylene waxes containing vinyl acetate."

When the film-forming copolymer is an ethylene/vinyl acetate copolymer, its vinyl acetate content is preferably 15–30%; it may be a mixture of ethylene/vinyl acetate copolymers of differing vinyl acetate contents, having an average content within the above range. For example an ethylene/vinyl acetate copolymer of vinyl acetate content 17–19% may be used, or a copolymer of higher vinyl acetate content and relatively high melt flow index, e.g. 25–28% and above 500 respectively.

The compositions may contain a viscosity depressant, e.g. microcrystalline wax. The amount of this ingredient will not normally exceed 60%, and more usually will not exceed 20%.

The following is a general indication of suitable amounts of the above ingredients for the compositions:

Film-forming copolymer:
Ethylene/vinyl acetate copolymers as specified below

| Amount (by weight of the composition) | Weight percent of vinyl acetate in the copolymer | Melt flow index, (ASTM D1238) |
| --- | --- | --- |
| 20–80 | 17–19 | 430–500 |
| 0–60 | 24–26 | 335–465 |
| 0–80 | 27–29 | 335–465 |
| 0–20 | 39–42 | 45–70 |

Auxiliary polymer:
20–80% (by weight of the composition) of an ethylene/vinyl acetate copolymer of molecular weight below 5000 and vinyl acetate content 12–18%, e.g. "AC 400" referred to in the examples.

Microcrystalline wax:
0–60% by weight of the composition.

The compositions preferably contain, besides the film-forming and auxiliary copolymers, an adhesion modifier, an anti-oxidant, and a stabiliser against the effect of ultraviolet radiation.

The adhesion modifier is preferably a rosin acid dimer or a saturated pentaerythritol rosin ester; other rosin acid derivatives of softening point between about 100° and 150° C. can also be used.

As the antioxidant pentaerythritol-tetra-$\beta$-(3,5-t-butyl-4-hydroxyphenyl)-propionate is particularly useful and as the U.V. stabiliser triazole stabilisers are preferred.

As a guide to the choice of suitable components and proportions in the mixture, it will usually be preferable to select them to give a melt viscosity up to about 250 poises, measured on a Davenport extrusion rheometer at a temperature of 180° C. and at a shear stress of $6.25 \times 10^4$ dynes/sq.cm. It will generally be advantageous to choose a composition having a relatively low melt viscosity, say 10–50 poises.

The coating compositions may further contain known adjuvants of various kinds, for example viscosity depressants; fillers, e.g. to render the coating opaque when this is desired, or to increase resistance to abrasion or adhesive strength; resins of various types, to modify adhesive properties or viscosity, or plasticisers to increase the flexibility of the coating.

As stated above, the compositions are applied to the substrate by spraying from the melt. The melt may be fed to the spraying nozzle directly by pumping and sprayed without air assistance. Alternatively an extruder, e.g. an advancing screw extruder, could be employed in some circumstances, particularly when compositions of very high viscosity are to be used.

Another possible method is to use an air-assisted spray, the air being preferably pre-heated to above the temperature of the melt e.g. up to 400° C. Suitable spray nozzles and apparatus for this general method of working are known.

Figure 2:
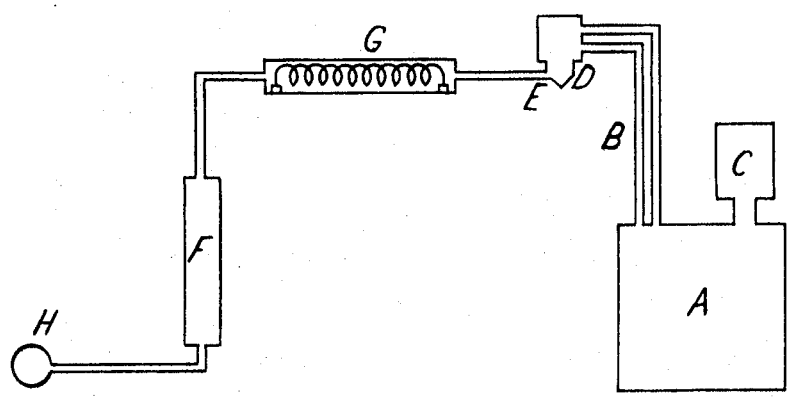

Apparatus for spraying the compositions is illustrated in the accompanying drawings, in which:

FIG. 1 is a schematic view of an apparatus for feeding the molten composition direct to the spray nozzle under pressure, and FIG. 2 is a schematic view of air-spray equipment.

Referring first to FIG. 1 which illustrates the more preferred apparatus, the composition 5 is contained in an open-topped vessel 4 which is heated and the temperature thermostatically controlled by means not shown. A reciprocating pump 3 disposed vertically above and extending into the vessel below the surface of the melt provides means for pumping the composition to a pulsation dampening vessel 6. Forward of the vessel 6 a burst disc 7 is located in the pathway of the melt and forward of that a 100 mesh filter 8 is provided. A hose 9 made of a suitable material such as stainless steel communicates the filter 8 with a spray gun 10 of a kind known in itself, having a spray nozzle 12. A 100 mesh filter 11 is provided within the spray gun 10 immediately before nozzle 12. An air pressure regulator 1 and safety valve 2 are connected to the pump 3. Pump 3, pulsation dampener 6, burst disc 7, filter 8 and hose 9, and, if necessary, the conduits connecting them are surrounded by heating means with a thermostatic control (not shown) and are thermally insulated.

The general operation of the apparatus will be self-evident: arrows indicate the direction of flow of the molten material, and the atomised hot composition emerging from nozzle 12 is indicated at 13. The pressure of the melt at the gun is typically 4,000 p.s.i. (280 kg./sq.cm.) or more.

When the composition is sprayed, the droplets may cool in the air to such an extent that, when they reach the subtrate, they are too cold to coalesce properly. The larger the area to be sprayed simultaneously, the further the nozzle must be from the substrate, and therefore the more likely is this to happen. To counteract this the substrate may be heated, to a temperature below the softening point of the composition for example to temperatures up to 80° C., preferably up to 60° C. either before or after it has been coated. In practice the substrate will usually be metallic and therefore easily heatable.

Referring to FIG. 2, another, but less preferred, form of apparatus comprises a pre-melt chamber A in which the composition is maintained in the molten state connected to a closed-circuit transmission line B, one leg of which is provided with a pump C capable of forwarding the molten composition round the circuit. The closed-circuit includes an air-operated spray nozzle D. Air is passed from a source H through a flow-meter F and a heater G, by means of which it is brought to a closely controlled elevated temperature at which it passes through a conduit E to the nozzle D. Again, the substrate may be heated if required.

The invention is illustrated by the following examples. "Parts" and percentages are by weight unless otherwise state. The most preferred of the compositions is that of Example 1.

EXAMPLE 1

A strippable protective coating is obtained by spraying a melt in the apparatus of FIG. 1. The following composition was used:

Parts
Ethylene/vinyl acetate copolymer of vinyl acetate content 17–19%, melt flow index 430–580 and molecular weight about 150,000 ("Elvax 410") _____ 40
Ethylene/vinyl acetate copolymer of vinyl acetate content 15%, having a melt viscosity of 500 centipoises at 284° F. (140° C.), and molecular weight about 3,500 ("AC 400") _____ 45
Microcrystalline wax, solidification point 190–195° F. (88–91° C.), and having a maximum penetration of 7 as measured by A.S.T.M. method D1321 at 25° C. _____ 15

Stabilisers against ultra-violet radiation, antioxidants and other additives may be present in small amounts, e.g. the following:

| | Parts |
|---|---|
| Pentaerythritol tetra-beta - (3,5-di-t-butyl-4-hydroxyphenyl)propionate | up to 0.5 |
| Dilauryl thiopropionate | up to 0.25 |
| Triazole-based U.V. stabiliser ("Tinuvin P," made by Geigy) | up to 0.25 |

This composition had a melt viscosity of 14–16 poises at 175° C.

EXAMPLE 2

A useful strippable protective coating is obtained by spraying from the melt the following composition.

| | Parts |
|---|---|
| Ethylene/vinyl acetate copolymer of vinyl acetate content 18%, melt flow index 430–580, and molecular weight about 150,000 ("Elvax 410") | 40 |
| Ethylene/vinyl acetate copolymer of vinyl acetate content 15% and molecular weight about 3,500 ("AC 400") | 56 |
| Mixed rosin acid dimer of ring and ball softening point 139° C. and molecular weight about 500 | 2 |
| Pentaerythritol tetra-β-(3,5-t-butyl-4-hydroxyphenyl)-propionate | 1 |
| Triazole-based U.V. stabiliser ("Tinuvin P," made by Geigy) | 1 |

An easily strippable but effective protection film 0.03 inch/thick was obtained.

EXAMPLE 3

Example 2 was repeated, except that the third component (adhesion modifier) was omitted. This film was more easily strippable after weathering.

EXAMPLE 4

The substrate consisted of steel sheet carrying a coating of an acrylic-based paint such as is used for automobile bodywork. The apparatus of FIG. 2 was employed, using as the spraying medium air at 175° C. at a flow rate of 60 litres per minute. The substrate was moved relatively to the nozzle across the front of the spray at 1 foot (30 cm.) per minute, at a distance from the nozzle of 1 inch (2.5 cm.). The melt temperature was in all cases about 175° C. The strippability of the resulting film was estimated by cutting a strip 1 inch (2.5 cm.) wide and removing the film by hand.

The composition employed consisted of a mixture of 40 parts of "Elvax 410" and 60 parts of "AC 400." There was formed on the substrate a satisfactorily strippable film 0.030 inch (0.79 mm.) thick, somewhat marked with ripples.

EXAMPLE 5

Example 4 was repeated, except that the distance between the substrate and the nozzle was 6 inches (15 cm.). A similarly strippable film was formed, 0.010 inch (0.25 mm.) thick and free from ripple marks.

EXAMPLE 6

Example 5 was repeated, except that the air was at the ambient temperature. The film obtained was generally similar to that of Example 5, except that its continuity was not so good.

EXAMPLES 7–14

Tests for strippability were made using the compositions given in Table 1. In all cases the strippability of the film was satisfactory.

TABLE I

| | Weight ratio of film-forming copolymer to auxiliary polymer | Auxiliary polymer | |
|---|---|---|---|
| | | Vinyl acetate content, percent | Mol. weight (average) |
| Example: | | | |
| 7 | 30:70 | 10 | 3,000 |
| 8 | 40:60 | 10 | 3,000 |
| 9 | 50:50 | 10 | 3,000 |
| 10 | 30:70 | 18 | 7,100 |
| 11 | 40:60 | 18 | 7,100 |
| 12 | 50:50 | 18 | 7,100 |
| 13 | 30:70 | 15 | 3,500 |
| 14 | 50:50 | 15 | 3,500 |

Similarly useful coatings were obtained using polyethylene of molecular weight about 2000 as the auxiliary polymer.

EXAMPLES 15–21

These examples were carried out in the same way as Examples 7–14, except that the auxiliary polymer was a mixture of "AC 400" (ethylene/vinyl acetate copolymer of vinyl acetate content 15% and average molecular weight about 3500) with a polyethylene wax of average molecular weight about 2000. The proportions in which the various components were used are shown in Table II.

TABLE II

| | Film-forming copolymer (percent) | Auxiliary polymer (percent) | |
|---|---|---|---|
| | | Ethylene/vinyl acetate copolymer | Polyethylene |
| Example: | | | |
| 15 | 30 | 60 | 10 |
| 16 | 60 | 30 | 10 |
| 17 | 30 | 50 | 20 |
| 18 | 50 | 30 | 20 |
| 19 | 20 | 60 | 20 |
| 20 | 40 | 30 | 30 |
| 21 | 40 | 20 | 40 |

In all cases satisfactorily strippable films were obtained.

EXAMPLES 22–25

In these examples the auxiliary polymer was a polyethylene wax of average molecular weight about 6000, and the weight ratio film-forming copolymer:auxiliary polymer was 40:60. The film-forming copolymers used are given in Table III.

TABLE III

| | Film-forming copolymer | |
|---|---|---|
| | Vinyl acetate content, percent | Melt flow index |
| Example: | | |
| 22 | 17–19 | 430–580 |
| 23 | 11 | 125–175 |
| 24 | 27–29 | 340–470 |
| 25 | ¹ 24–26 | 500 |

¹ The film-forming polymer was a terpolymer containing a proportion of acid residues.

The films of Examples 22, 23 and 24 were satisfactorily strippable, but that of Example 25 adhered more strongly to the substrate than those of the other examples, and was somewhat less easy to remove, though satisfactory in other respects.

EXAMPLE 26

Tests were made to determine the ease of stripping of four different films from various substrates. The compositions of the films are given in the following table:

| Constituents | A | B | C | D |
|---|---|---|---|---|
| Film-forming copolymer of Example 5 | 40 | 60 | 40 | 40 |
| Auxiliary copolymer of Example 13 | 60 | 30 | | |
| Auxiliary copolymer of Example 10 | | | | 60 |
| Polyethylene of M.W. 2,000 | | 10 | 60 | |

Films 0.010 inch (0.25 mm.) thick were formed on various substrates, and assessed for strippability by peeling by hand and examining the substrate to see if it had suffered any damage. The results are shown in the following table:

| Substrate | Film-forming compositions | | | |
|---|---|---|---|---|
| | A | B | C | D |
| Rubber (windscreen gasket) | Good | Fair | Fair | Good. |
| Acrylic lacquer (I) | Excellent | Good | Good | Good. |
| Metallic lacquer | do | Excellent | Excellent | Excellent |
| Primer coat (I) | Good | do | do | Do. |
| Primer coat (II) | Excellent | do | do | Do. |
| Primer surfacer coat | do | Good | Good | Poor. |
| Phosphated steel | Good | Good | Poor | Excellent. |
| Chrome plate | Excellent | Good | Poor | Do. |
| Cellulose nitrate lacquer | Fair | Poor | Poor | Poor. |
| Acrylic lacquer (II) | Excellent | Excellent | Excellent | Excellent. |
| Glass | do | Good | Good | Good. |

The results generally indicate that Composition A was to be preferred over B and D and especially C.

We claim:

1. A method of forming a strippable protective coating which comprises spraying a molten composition on a substrate and allowing the composition to solidify thereon, said composition containing a mixture of (a) about 14 to 83% by weight of a film-forming copolymeric material consisting of ethylene units polymerized with vinyl acetate units in such a ratio that the vinyl acetate unit content constitutes from about 15 to 40% of the net weight of the film-forming material, said polymeric material having a melt flow index within the range of about 40 to 750, with (b) about 17 to 86% by weight of an auxiliary polymeric material having an average molecular weight of less than 10,000 selected from the group consisting of polyethylene, copolymers of ethylene with vinyl acetate, and mixtures thereof.

2. A method according to claim 1 wherein component (a) is selected from the group consisting of ethylene/vinyl acetate copolymers having a vinyl acetate content of 15–30%, and mixtures of ethylene/vinyl acetate copolymers having an average vinyl acetate content of 15–30%.

3. A method according to claim 1 wherein the composition contains about 44 to 59% of film-forming polymer and 41 to 56% of auxiliary polymeric material.

4. A method according to claim 1 wherein component (a) consists of 20–80% of an ethylene/vinyl acetate copolymer of vinyl acetate content 17–19% and melt flow index 430–580, 0–60% of an ethylene/vinyl acetate copolymer of vinyl acetate content 24–26% and melt flow index 335–465, 0–80% of an ethylene/vinyl acetate copolymer of vinyl acetate content 27–29% and melt flow index 335–465, and 0–20% of an ethylene/vinyl acetate copolymer of vinyl acetate content 39–42% and melt flow index 45–70, all percentages being by weight and percentages of the copolymers being based on the total composition, component (b) consists of 20–80% by weight of the total composition of an ethylene/vinyl acetate copolymer of molecular weight below 5000 and vinyl acetate content 12–18% by weight.

5. A method according to claim 1 wherein the composition contains at least one additive of adhesion-modifiers, anti-oxidants or stabilizers against the effect of ultraviolet radiation.

6. A method according to claim 1 wherein the substrate is a vehicle body.

7. The method of claim 1 wherein the molecular weight of the auxiliary polymer is within the range of 1500 to 8000 and the composition has a melt viscosity of 10 to 50 poises.

8. A method according to claim 2 wherein component (a) is an ethylene/vinyl acetate copolymer having a vinyl acetate content of 17–19% and a melt flow index of 430–580.

9. A method according to claim 2 wherein component (b) is an ethylene/vinyl acetate copolymer having a vinyl acetate content of 12–18% and a molecular weight below 5,000.

10. A method according to claim 4 wherein the composition contains also up to 60% by weight of a microcrystalline wax.

11. A method according to claim 10 wherein the composition comprises 40% of an ethylene/vinyl acetate copolymer of vinyl acetate 17–19% and melt flow index 430–580, 45% of an ethylene/vinyl acetate copolymer of vinyl acetate content substantially 15%, having a molecular weight of 3,500 and 15% of microcrystalline wax.

References Cited
UNITED STATES PATENTS

| | | | |
|---|---|---|---|
| 2,406,039 | 8/1946 | Roedel | 117—132 |
| 2,485,248 | 10/1949 | Watson et al. | 117—122 |
| 3,132,027 | 5/1964 | Norton et al. | 117—132 X |
| 3,224,900 | 12/1965 | Creamer et al. | 117—132 X |
| 3,268,463 | 8/1966 | McAninch et al. | 117—6 X |

WILLIAM D. MARTIN, Primary Examiner

T. G. DAVIS, Assistant Examiner

U.S. Cl. X.R.

117—104 R, 105.1, 132 C, 161 U